(12) United States Patent
Bense

(10) Patent No.: US 8,950,707 B2
(45) Date of Patent: Feb. 10, 2015

(54) CONNECTION ARRANGEMENT, PARTICULARLY FOR AIRCRAFT STRUCTURE PARTS

(75) Inventor: Rolf Bense, Jork (DE)

(73) Assignee: Airbus Operations GmbH (DE)

( * ) Notice: Subject to any disclaimer, the term of this patent is extended or adjusted under 35 U.S.C. 154(b) by 10 days.

(21) Appl. No.: 13/484,440

(22) Filed: May 31, 2012

(65) Prior Publication Data

US 2012/0305709 A1 Dec. 6, 2012

Related U.S. Application Data

(60) Provisional application No. 61/491,497, filed on May 31, 2011.

(30) Foreign Application Priority Data

May 31, 2011 (DE) .......................... 10 2011 103 723

(51) Int. Cl.
*B64C 1/06* (2006.01)
*B21J 15/02* (2006.01)
*F16B 19/08* (2006.01)
*F16B 5/04* (2006.01)

(52) U.S. Cl.
CPC .............. *B21J 15/025* (2013.01); *F16B 19/08* (2013.01); *F16B 5/04* (2013.01)
USPC ....................................................... 244/131

(58) Field of Classification Search
USPC ............... 244/129.1, 131, 119; 411/339, 511, 411/517, 521, 446, 450
See application file for complete search history.

(56) References Cited

U.S. PATENT DOCUMENTS

| 3,733,958 | A | * | 5/1973 | Willey | 411/504 |
| 4,580,936 | A | * | 4/1986 | Francis et al. | 411/38 |
| 5,009,557 | A | * | 4/1991 | Dessirier | 411/504 |
| 5,915,901 | A | * | 6/1999 | Aasgaard | 411/29 |
| 6,125,524 | A | * | 10/2000 | Mueller | 29/520 |
| 6,648,273 | B2 | * | 11/2003 | Anast | 244/119 |
| 6,712,316 | B2 | * | 3/2004 | Jones | 244/132 |
| 7,001,125 | B2 | * | 2/2006 | Wojciechowski et al. | 411/180 |
| 7,124,492 | B2 | * | 10/2006 | Wojciechowski et al. | 29/515 |
| 7,401,394 | B1 | * | 7/2008 | Muller | 29/432.1 |
| 7,752,879 | B2 | * | 7/2010 | Diehl et al. | 72/114 |
| 7,878,746 | B2 | * | 2/2011 | Babej | 411/179 |
| 8,402,633 | B2 | * | 3/2013 | Wang | 29/525.06 |
| 2005/0183260 | A1 | | 8/2005 | Meyer | |
| 2013/0000101 | A1 | | 1/2013 | Rintelmann et al. | |

FOREIGN PATENT DOCUMENTS

DE 102009048398 A1 4/2011
EP 1541464 A1 6/2005

* cited by examiner

*Primary Examiner* — Joshua J Michener
*Assistant Examiner* — Keith L Dixon
(74) *Attorney, Agent, or Firm* — Lerner, David, Littenberg, Krumholz & Mentlik, LLP

(57) ABSTRACT

A connection arrangement for at least two abutting components to be firmly connected to one another, includes a self-piercing rivet having a rivet head for punching of a hole and subsequent riveting of the components, wherein a washer is allocated to the self-piercing rivet at the distal end region opposite to the rivet head, with the washer including a frontal area for the insertion of a circular indentation to create a firm compression connection between a hole in the washer and the distal end region of the self-piercing rivet.

8 Claims, 1 Drawing Sheet

CONNECTION ARRANGEMENT, PARTICULARLY FOR AIRCRAFT STRUCTURE PARTS

CROSS-REFERENCE TO RELATED APPLICATIONS

The present application claims the benefit of the filing date of U.S. Provisional Patent Application No. 61/491,497 filed May 31, 2011, the disclosure of which is hereby incorporated herein by reference.

AREA OF THE INVENTION

The invention relates to a connection arrangement for at least two adjacent components abutting each other, which are to be firmly connected, comprising a self-piercing rivet having a rivet head for punching of a hole and subsequent riveting of the components. Furthermore, the invention also relates to a process for the production of such a connection arrangement, a self-piercing riveting arrangement for said connection arrangement, and an aircraft structure.

The area of application of the present invention particularly concerns the construction of aircraft. The fuselage of a commercial aircraft is, in most cases, composed of tubular fuselage sections, which are abutting each other and are firmly connected with one another along orbital seams. The outer shell of an aircraft fuselage configured such is reinforced on the inner wall with stringers that follow longitudinal lines and ribs that follow transversal lines, which are connected by rivets with one another and with the outer shell, with the rivets running in equally spaced distances between each other along the connecting lines defined by the components.

BACKGROUND OF THE INVENTION

According to the generally known state of the art, riveted connections for the above mentioned purpose of application can be obtained such that, firstly, holes are drilled through the abutting components which are to be connected by rivets. In the following, rivets having a rivet head of a larger diameter are inserted into the holes such that the distal end region of the rivet, which is positioned opposite to the rivet head, extends from the drilled hole to subsequently deform said end region by means of a riveting tool such that a firm riveted connection is obtained. It is a disadvantage of this connection arrangement that, during the pre-drilling process of the holes for inserting the rivets, chips are produced the removal of which proves to be complex, considering the multitude of riveting points.

As an alternative to the solution mentioned above, self-piercing rivets, as they are commonly called, are also generally known, which are urged through the components to be connected thus forming a firm connection with the components. To this end, however, a particular self-piercing riveting tool is required, the bottom die of which usually shows a coining ring to allow a deformation of material. The coining ring urges deformed material into indentions of the self-piercing rivet thus creating the firm connection. However, this damage leads to a deterioration of the mechanical properties, particularly, of the fatigue strength of the riveted connection and, in addition, it has the disadvantage that, in case of repair, the area to be drilled out needs to be considerably larger than the connection element such that the indented structure caused by the coining ring is also drilled out.

EP 1 541 464 A1 discloses a different connection arrangement for aircraft structure parts, which applies particular multi-part rivets. These comprise a rivet shank having an elliptical cross-section and a rivet head at the end, opposite from which a circular part with a reduced diameter extends coaxially from the rivet shank, which has on the outside a circular groove structure. Said circular part co-acts with a separate washer. When the washer is clamped radially from the outside, a firm connection between the rivet and the washer is obtained. The protruding part of the circular part will have to be removed subsequently. Also this connection arrangement requires an extensive chip-generating drilling of the aligned holes through the components, because the rivet cannot serve as a self-piercing rivet due to the circular part.

BRIEF SUMMARY OF THE INVENTION

An aspect of the present invention to provide a connection arrangement based on rivets, which is easily mountable, and which is characterized by a high fatigue strength and easy repairability.

An aspect of the invention comprises the technical teaching that a self-piercing rivet is allocated, at the distal end region opposite the rivet head, a particular washer having a frontal area for coining of a circular indentation in order to create a firm compression connection between a hole in the washer and the end region of the self-piercing rivet.

An advantage of the solution according to the invention, in particular, is that the coining ring at the bottom die of the riveting tool does not get in direct contact with the component to be connected any more such that the component is not damaged any more. In addition, the deformations occurring during the riveting process, primarily, affect both the washer and the distal end region of the self-piercing rivet such that the rivet will be removable in case of repair using a drilling diameter, which is not essentially larger than the diameter of the rivet shank.

Preferably, the particular washer comprises a coaxial hole for insertion of the distal end region of the rivet shank and a circular indentation at the frontal area of the washer. Thus the circular indentation is inserted in an axial direction, which results in a deformation of the periphery around the coaxial opening such that the material of the washer in this area is urged from the outside in direction of the end region of the rivet shank to create the firm connection.

To create a particularly firm connection, it is suggested that the distal end region of the rivet shank comprises at least one encircling annular groove to achieve, that the washer and the rivet shank establish a tight fit radially from the outside. Preferably, the volume of the circular indentation has, at least, the size of the volume of the encircling annular groove to guarantee a safe additional tight fit between the components of the self-piercing riveting arrangement.

The components to be connected by means of the particular connection arrangement described above are, preferably, configured plate-shaped and comprise one metal sheet each. It is also conceivable to connect plates made of plastic material or similar by means of said connection arrangement, provided that these are generally suitable for self-piercing rivets. Within the framework of the solution according to the invention, the components are preferably embodied as aircraft structure parts.

The connection arrangement according to the invention can be produced according to the following process steps:
Positioning of the two components to be connected as well as of the washer,
Punching of a hole through the two components and through the washer by insertion of the self-piercing rivet by means of a riveting punch tool, and Riveting of the components by deformation of the self-piercing rivet in connection with the insertion of an indention on the front side of the washer that is allocated to the self-piercing rivet.

BRIEF DESCRIPTION OF THE DRAWINGS

Further measures improving the invention are described below in more detail, together with a description of a preferred example of embodiment of the invention by means of the figures. The following is shown.

Figure 1:
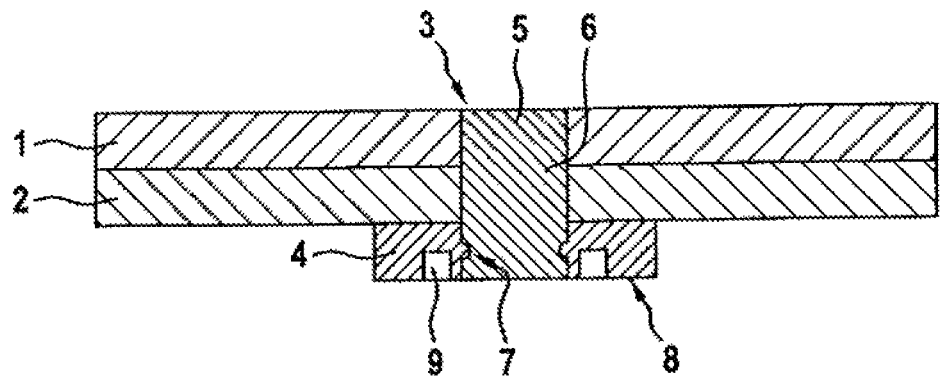
FIG. 1 a schematic longitudinal section through a riveted connection comprising a self-piercing rivet and a washer, and FIG. 2 a schematic lateral view of the bottom die of the riveting tool with abutting washer.

The connection arrangement shown in FIG. 1 comprises two abutting components (1) and (2), which are both embodied as plate-shaped metal sheets. Both components (1) and (2) are firmly connected by means of a particular self-piercing rivet (3) and a washer (4), by which means they are riveted.

In this process, the self-piercing rivet (3) itself creates, as a consequence of the punching process through the two components (1) and (2) as well as through the washer (4), the hole which is necessary for a firm connection of the components (1) and (2). After the self-piercing rivet (3) is punched through, the rivet head (5) of the self-piercing rivet (3) is flush with the exterior surface of the component (1). The cylindrical rivet shank (6), having a smaller diameter, protruding from the rivet head (5), perforates the two components (1) and (2) and the washer (4). At the distal end of the self-piercing rivet (3), an encircling annular groove (7) is inserted to establish an additional tight fit. Said tight fit is obtained by material that is urged into the groove of the washer (4) during the riveting operation.

At the frontal area (8) of the washer (4) a circular indentation (9) is inserted, which is arranged annularly around the periphery of the opening. The circular indentation (9) possesses a sufficient groove depth such that a material displacement effect in direction of the groove (7) around the rivet shank (6) is created to provide an additional tightly fitting connection between both components. On the other hand, at the particular area provided for the circular indentation (9) at the frontal area (8) of the washer (4), the material deformation has a pressing effect onto the rivet shank (6) of the self-piercing rivet (3). At the same time, the washer (4) with its exterior diameter offers a much larger abutting area in comparison with the circular indentation (9) towards component (2), which thus remains protected against damages from the coining operation.

Figure 2:
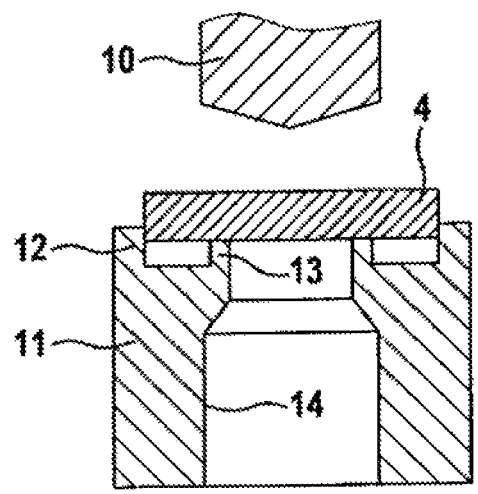

The riveting tool shown in FIG. 2 comprises an—only roughly sketched—upper riveting punch (10), which works together with a lower coining die (11). The washer (4) is placed onto the coining die (11) such that its exterior circumference abuts at an encircling stop collar (12) of the coining die (11). The stop collar (12), among other things, prevents the undesired radial extension of the washer (4) during the coining operation, to the end of which a coining ring (13) is formed at the coining die (11).

The coining ring (13) is aligned within, and coaxially to, the stop collar (12). Besides that, the coining die (11) also comprises a die opening (14) having a cutting edge located radially at the upper inside of the coining ring (13), by means of which the material, which is cut out by the self-piercing rivet (3)—which is not further shown—of the components to be connected, is discharged downwards. The coining die (11) and also the riveting punch (10) consisting of a hardened steel material.

By means of said tool, after the positioning of the components (1) and (2), which are to be connected—which are not shown here either—the hole for insertion of the self-piercing rivet (3) is punched. Subsequently, by means of the same tool stroke the riveting of the components by deformation of the distal end region of the self-piercing rivet (3) in connection with the washer (4) is performed by insertion of the circular indentation (9) at its lower frontal area (8).

Said connection arrangement is particularly suitable for riveting of aircraft structure parts, such as of the exterior shell, stringers, ribs and other connection metal sheets, as, due to the particular self-piercing rivets according to the invention, one does not need to worry about any significant damaging done to the exterior surface of the components to be connected within the periphery of the self-piercing rivet. Thus, a high fatigue strength of the riveted connection is obtained, and the self-piercing riveting arrangement according to the invention may in case of repair also be removed, if necessary, in a simple manner by drilling using a drill having a small diameter.

LIST OF REFERENCES 1 first component
2 second component
3 self-piercing rivet
4 washer
5 rivet head
6 rivet shank
7 annular groove
8 frontal area
9 circular indentation
10 riveting punch
11 coining die
12 stop collar
13 coining ring
14 die opening

The invention claimed is:

1. A connection arrangement for at least first and second abutting components to be firmly connected, comprises:
   a self-piercing rivet having a rivet head for punching of a hole and subsequent riveting of the first and second components, and
   a washer allocated to the self-piercing rivet at the distal end region, which is situated opposite to the rivet head,
   wherein the washer comprises a frontal area for the insertion of a circular indentation to create a compression connection between a hole in the washer, punched in by the self-piercing rivet, and the distal end region of the self-piercing rivet.

2. The connection arrangement according to claim 1, wherein the distal end region of a rivet shank comprises at least one encircling annular groove to establish a tight fit radially from the outside in co-action with the washer.

3. The connection arrangement according to claim 2, wherein the volume of the circular indentation is at least of the size as the volume of the encircling annular groove.

4. The connection arrangement according to claim 1, wherein the circular indentation is arranged annularly coaxially around the periphery of the hole in the washer.

5. The connection arrangement according to claim 1, wherein the self-piercing rivet comprises a cylindrical rivet shank and a conic rivet head at its end.

6. The connection arrangement according to claim 1, wherein the first and second components are configured plate-shaped, comprising one metal sheet each.

7. The connection arrangement according to claim 1, wherein the first and second components are configured as aircraft structure parts.

8. An aircraft structure comprising at least first and second components firmly connected to one another by a connection arrangement, the connection arrangement comprising:
   a self-piercing rivet having a rivet head for punching of a hole and subsequent riveting of the first and second components, and
   a washer allocated to the self-piercing rivet at the distal end region, which is situated opposite to the rivet head,
   wherein the washer comprises a frontal area for the insertion of a circular indentation to create a compression connection between a hole in the washer, punched in the self-piercing rivet, and the distal end region of the self-piercing rivet.

* * * * *